(12) United States Patent
Deforest et al.

(10) Patent No.: US 8,423,722 B1
(45) Date of Patent: Apr. 16, 2013

(54) SYSTEM AND METHOD FOR HIGH PERFORMANCE COMMAND PROCESSING IN SOLID STATE DRIVES

(75) Inventors: Marvin R. Deforest, Niwot, CO (US); Matthew Call, Longmont, CO (US); Mei-Man L. Syu, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 56 days.

(21) Appl. No.: 13/219,555

(22) Filed: Aug. 26, 2011

(51) Int. Cl.
*G06F 12/00* (2006.01)

(52) U.S. Cl.
USPC .......................................................... 711/148

(58) Field of Classification Search .................. None
See application file for complete search history.

(56) References Cited

U.S. PATENT DOCUMENTS

| | | | |
|---|---|---|---|
| 7,065,608 B2 * | 6/2006 | Nakanishi | 711/103 |
| 7,280,426 B2 * | 10/2007 | Miura et al. | 365/230.03 |
| 7,373,452 B2 * | 5/2008 | Suh | 711/103 |
| 7,386,655 B2 * | 6/2008 | Gorobets et al. | 711/103 |
| 7,809,878 B2 * | 10/2010 | Yoo et al. | 711/103 |
| 7,873,759 B2 | 1/2011 | Tomonaga et al. | |
| 2008/0049520 A1 * | 2/2008 | Kang et al. | 365/185.33 |
| 2008/0086589 A1 | 4/2008 | Urabe et al. | |
| 2008/0147968 A1 | 6/2008 | Lee et al. | |

* cited by examiner

*Primary Examiner* — Hiep Nguyen

(57) ABSTRACT

Solid State Drives (SSD) can yield very high performance if it is designed properly. A SSD typically includes both a front end that interfaces with the host and a back end that interfaces with the flash media. Typically SSDs include flash media that is designed with a high degree of parallelism that can support a very high bandwidth on input/output (I/O). A SSD front end designed according to a traditional hard disk drive (HDD) model will not be able to take advantage of the high performance offered by the typical flash media. Embodiments of the invention provide improved management of multiple I/O threads that take advantage of the high performing and concurrent nature of the back end media, so the resulting storage system can achieve a very high performance.

23 Claims, 4 Drawing Sheets

SYSTEM AND METHOD FOR HIGH PERFORMANCE COMMAND PROCESSING IN SOLID STATE DRIVES

BACKGROUND

1. Technical Field

This disclosure relates to non-volatile storage subsystems, including but not limited to flash drives. More particularly, the disclosure relates to systems and methods for high performance command processing in solid state drives.

2. Description of the Related Art

Flash media used in solid-state storage systems can provide a very high bandwidth. However, processing delays for incoming commands can be a cause of perceptible delays from the host. Typical command processing interprets commands via a data path that does not take advantage of the concurrency offered by the flash media in solid-state storage systems. A system that can process multiple read and write commands from the host and quickly pass these commands to the storage media back end can improve processing performance and reduce delay.

BRIEF DESCRIPTION OF THE DRAWINGS

Systems and methods that embody the various features of the invention will now be described with reference to the following drawings, in which.

DETAILED DESCRIPTION

While certain embodiments of the inventions are described, these embodiments are presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions.

Overview

Solid State Drives (SSD) can yield very high performance if it is designed properly. A SSD typically includes both a front end that interfaces with the host and a back end that interfaces with the flash media. Typically SSDs include flash media that is designed with a high degree of parallelism that can support a very high bandwidth on input/output (I/O). A SSD front end designed according to a traditional hard disk drive (HDD) model will not be able to take advantage of the high performance offered by the typical flash media. Embodiments of the invention provide improved management of multiple I/O threads that take advantage of the high performing and concurrent nature of the back end media, so the resulting storage system can achieve a very high performance.

System Overview

Embodiments of the invention are directed to systems and methods for providing a high performance data path on a solid-state storage system. As used in this application, "non-volatile memory" typically refers to solid-state memory such as NAND flash. However, the systems and methods of this disclosure may also be useful in more conventional hard drives and hybrid drives including both solid-state and hard drive components. As such, while certain internal operations are referred to which typically are associated with solid-state drives, such as "wear leveling" and "garbage collection," analogous operations for hard drives can also take advantage of this disclosure. Solid-state memory may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. The solid-state storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Figure 1:
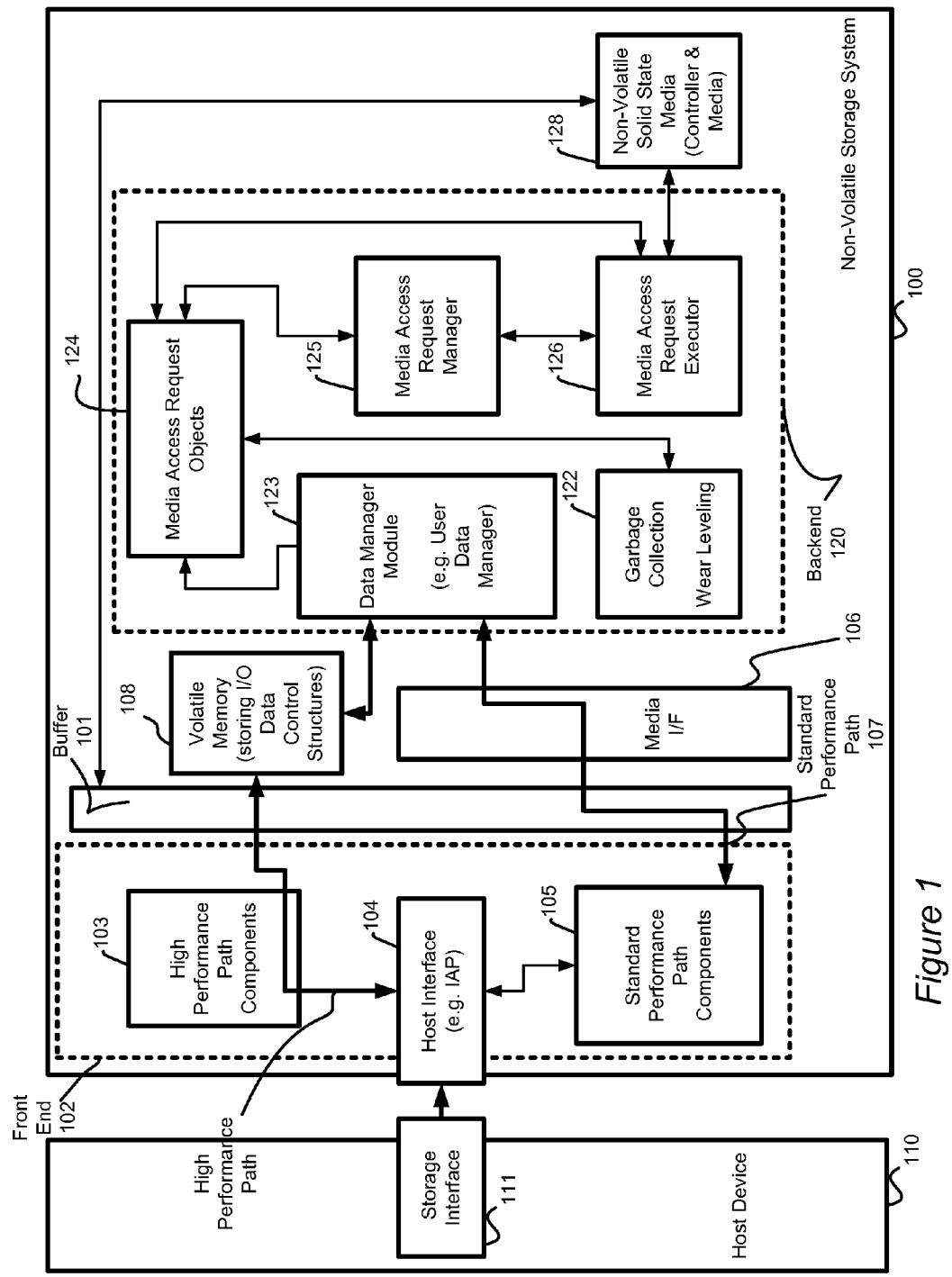
FIG. 1 is a block diagram that provides a system overview of a non-volatile storage system with a high performance data path according to an embodiment.

FIG. 1 shows an embodiment of a solid-state non-volatile storage system 100 connected to a host device 110. The host device 110 communicates with a host interface 104 of the non-volatile storage system 100 using a host storage interface 111. The host storage interface 111 can communicate with the host interface 104 using any known communication protocol, such as SATA, SCSI, SAS, USB, Fibre Channel, PCIe, eMMC, etc. In one embodiment, the communication protocol allows for the use of tagged commands, such that multiple read and/or write commands may be pending on the storage system simultaneously. Tagged commands can include tagged command queuing and native command queuing tags.

In one embodiment, host commands are received by the host interface 104 and are processed. The host interface may be implemented as an Interface Assist Processor (IAP). The host interface in one embodiment is implemented as firmware on a processor (e.g., SoC) that may also implement a number of other components that make up part or all of a front end 102. For example, as shown, the front end includes a number of high performance path components 103 and standard performance path components 105.

When a command is received in the host interface 104, the host interface processes the command by determining whether the command should be handled via a high performance path (through its associated components 103) or a standard performance path (through its associated components 105). The processing may additionally involve parsing of the incoming command such as determining command type, logical address for the command, size of data to be transferred, etc.

In one embodiment, regardless of whether the command is processed via the high performance or standard performance path, the host interface 104 sends instructions based on the command to the back end components 120, which are tasked with processing the instructions by sending the appropriate media access requests to the media 128. For example, the front end may provide to the back end instructions for a read command, and the instructions may include a logical address and a command size of the read command. The back end may then process the instructions by issuing requests to the media to fulfill the instructions. In one embodiment, a data manager module 123 is tasked with processing the instructions from the host interface 104. The data manager module 123 may perform additional processing, such as performing mapping table lookups and issuing media access requests to the media

128. The data manager module 123 also provides status updates back to the front end (including, for example, the host interface 104) indicating whether the requests were completed successfully or not.

In one embodiment, the requests may be handled via the use of media access request objects 124, which are managed by a media access request manager 126. The media access request objects are executed in the media 128 by a media access request executor 126. A separate component 122 may also issue data access requests related to internal maintenance operations such as garbage collection and wear leveling. In other embodiments, the data manager module 123, the media access request manager 125, and the media access request executor 126 may be combined into one module that manages data access requests to the media. Each of these modules may be implemented as firmware on one or more processors and/or as dedicated hardware (e.g., System on Chip (SoC)).

Data Control Structures and Associated Buffer Allocations

In one embodiment, if the command is to be processed via the high performance path, the host interface 104 is configured to communicate instructions to the data manager module 123 via a number of data control structures, which in one embodiment are memory objects stored in volatile memory 108. The volatile memory 108 may be implemented as DRAM (Dynamic Random Access Memory), for example, and in one embodiment this volatile memory is configured to be accessed by both the front end and the back end, and in particular, the host interface 104 and the data manager 123. Additional details regarding the data control structures will be provided in conjunction with FIG. 4 below. Alternatively, if the command is sent via the standard performance path, which in one embodiment processes one command at a time, a single data control structure may be used to process the command. In another embodiment, along the standard performance path, the instructions regarding the command may be sent to the back end without the use of a data control structure.

On the high performance path, the data control structures serve as conduits through which communications are facilitated between the front end 102 and the back end 120, and in particular, between the host interface 104 and the data manager module 123. This greatly improves performance as instructions from the front end to the back end no longer needs to be copied, which is typically performed in prior implementations. In particular, the use of a common RAM area across the front end and the back end to hold common data control structures means that the system needs to populate the I/O control information in the data control structures once, and does not need to perform the same tasks twice (once in the front end and once in the back end). In one embodiment, the data control structures can be used across the entire system. For example, nexus information can be used for both front end and back end for command processing, error handling, command completion, etc. This use of common data control structures throughout the storage system 100 thus reduces the overall command processing overhead. These data control structures also allow for improved concurrent processing of multiple commands in the storage system.

In one embodiment, the data control structures can each be independently updated by either the host interface 104 or the data manger module 123. In one embodiment, the number of data control structures matches a number of commands that can be processed at a time in the non-volatile storage system 100. For example, a system using a SATA interface may have a maximum of 32 tagged commands, and in that embodiment, the volatile memory includes 32 pre-allocated data control structures to enable servicing of the entire range of tagged commands without delay. In other embodiments such as SAS where the maximum number of commands is 128, the number of data control structures may be less than the maximum number, or may match the maximum number, if a larger volatile memory is used to store the data control structures and a larger data buffer is used to store data to be transferred between the host and the media.

In one embodiment, the storage system includes a buffer 101 for temporary storage of data to be written to, and/or to be read from, the solid state media 128. In one embodiment, each data control structure is associated with a designated buffer allocation within the buffer 101. Thus, in the example above where there are 32 data control structures, 32 designated buffer allocations may be provided, so that each of the 32 data control structures has a designated buffer allocation associated with it.

In one embodiment, the buffer allocations are reused by the data control structures. For example, a particular buffer allocation may consistently be used with a data control structure. With the pre-set data control structures and pre-set buffer allocations, the system does not need to allocate resources to process the incoming commands upon their arrival. Conversely, after the commands are completed, the system does not need to de-allocate resources. The data control structures and buffer allocations are simply re-used for the next set of new commands from the host. This reduces the per-command processing overhead, as well as provides both the front end and the back end an efficient way to handle multiple commands at the same time.

The use of the data control structures enables the system to arm for random commands. Sequential automation (automating processing of sequential commands) is commonly performed in many hard disk storage controllers to increase performance. However, random automation (automating processing of random commands) is not commonly performed. In various embodiments of the invention, random automation is performed as follows. Prior to a command arriving from the host, the data manager module sets up certain data control structures and performs other preparatory tasks such as setting flags and preparing for queuing. Therefore, once a command arrives from the host with the logical address information, minimal additional processing needs to be done and the command can be processed quickly. In one embodiment, some or all of the data control structures are pre-configured to handle a command with a certain data size (e.g., 128 kb), so that when a random read or write command of that data size (or smaller) arrives, the above discussed pre-processing can be leveraged and the command can be processed quickly. This improves the random IOPS for the overall system. In one embodiment, an "over-sized" command that is beyond the data size (e.g., 256 sectors or 128 kb) may be sent via the standard performance path for processing. As discussed above, the standard performance path may handle one command at a time as supposed to the concurrent multiple-command processing capability of the high performance path. Other internal storage system commands that are not as performance sensitive as the host-issued ones may also be handled via the standard performance path.

Command Process Flow

Figure 2:
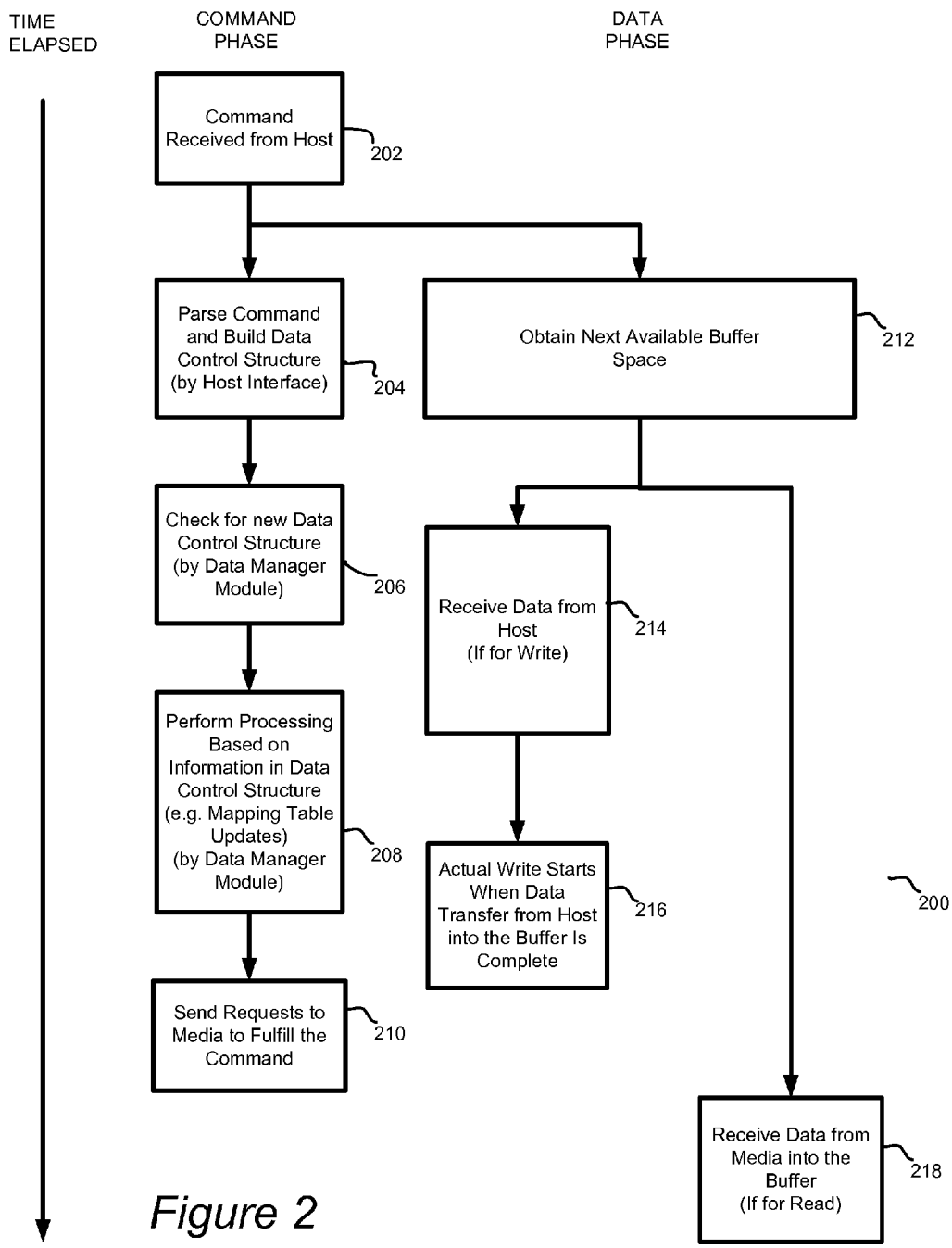
FIG. 2 is a flow diagram showing the processing of data access commands according to an embodiment.

FIG. 2 is a flow diagram showing the processing of data access commands according to an embodiment. The process flow 200 is illustrated in two concurrent phases: a command phase and a data phase. In the command phase, in block 202, a command is first received from the host. The host interface 104 then parses the command and builds out the data control structure for the command in block 204. In block 206, the data manager module then checks for the new data control structure and performs processing based on information in the data control structure in block 208. The processing may include performing mapping table updates and readying requests to the media to fulfill the execution of the command. Then, in block 220, the request(s) to fulfill the command are sent to the media. In one embodiment, for a write command, the action in block 220 is performed when the data to be written has been fully received from the host (see block 216), though in other embodiments the action can be performed concurrently with the receiving of the write data (i.e., prior to the receipt of all the write data). Although not shown, the data manager module may afterwards write updates back to the data control structure to indicate whether the request(s) to the media were completed successfully.

Concurrent to the above process in the data phase are a number of processing steps in the data phase. After the command is received, the data manager module and/or the host interface obtains the next available buffer space for data to be transferred for the command. If the command is a write command, at block 214 data is received from the host. This is performed while the processing is done on the command phase side, so that concurrency can be maximized. At block 216, the actual writing of the data starts as soon as the data is transferred from host, at which point the write requests are dispatched to the media. The dedicated buffer in the storage system allows the data transfer to occur concurrently with the command processing. In this manner, the command processing time can overlap with the host data transfer time, thus enabling the system to take full advantage of the high bandwidth offered by the solid-state media. Alternatively, if the command is a read command, the data read from the media is transferred into the buffer when the read request(s) fulfilling the read command are dispatched to the media (block 218).

Coalescing Updates from the Media

Figure 3:
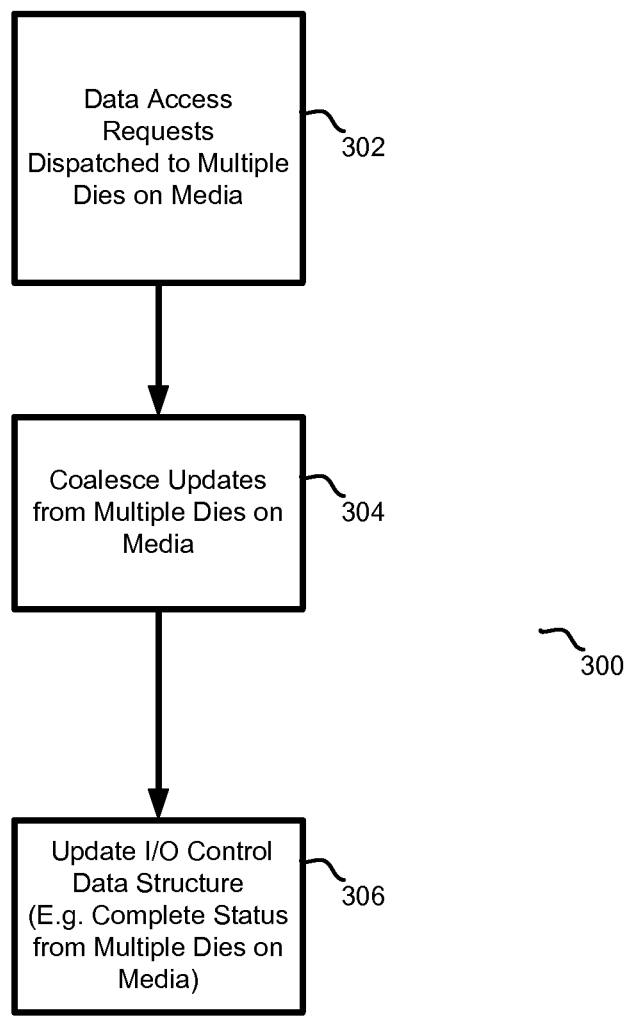
FIG. 3 is a flow diagram showing the process of coalescing updates from the media and bundling updates for reporting to the data control structures according to an embodiment.

FIG. 3 is a flow diagram 300 showing the process of coalescing updates from the media and bundling updates for reporting to the data control structures according to an embodiment. As discussed above, the system manages multiple active I/O data threads, with each being tracked by a data control structure. In one embodiment, the multiple I/O data threads are concurrently dispatched to the media firmware, and the back end components such as the data manager module handles coherency, data transfer, and command completion according to those multiple I/O threads. This is done so that the media is kept as busy as possible. In the flow diagram 300, the data manager 123 (or another back end component) dispatches data access requests to multiple devices (e.g., dies) on the media in block 302. Then the updates (e.g., completion status, error status) from the devices are coalesced in block 304. In block 306, the associated data control structures are updated according to the coalesced updates. The process of coalescing can arrange updates that arrive from the media out of order. For example, a write command may be associated with eight requests Nos. 1-8 to eight dies on the media, and due to the nature of the dies in the media certain requests may complete first. In this example, the completion statuses for dies Nos. 5-8 may arrive from the media at the data manger module before those from dies Nos. 1-4. Such updates may be bundled together into a single status update to the associated data control structure.

Data Control Structures

Figure 4:
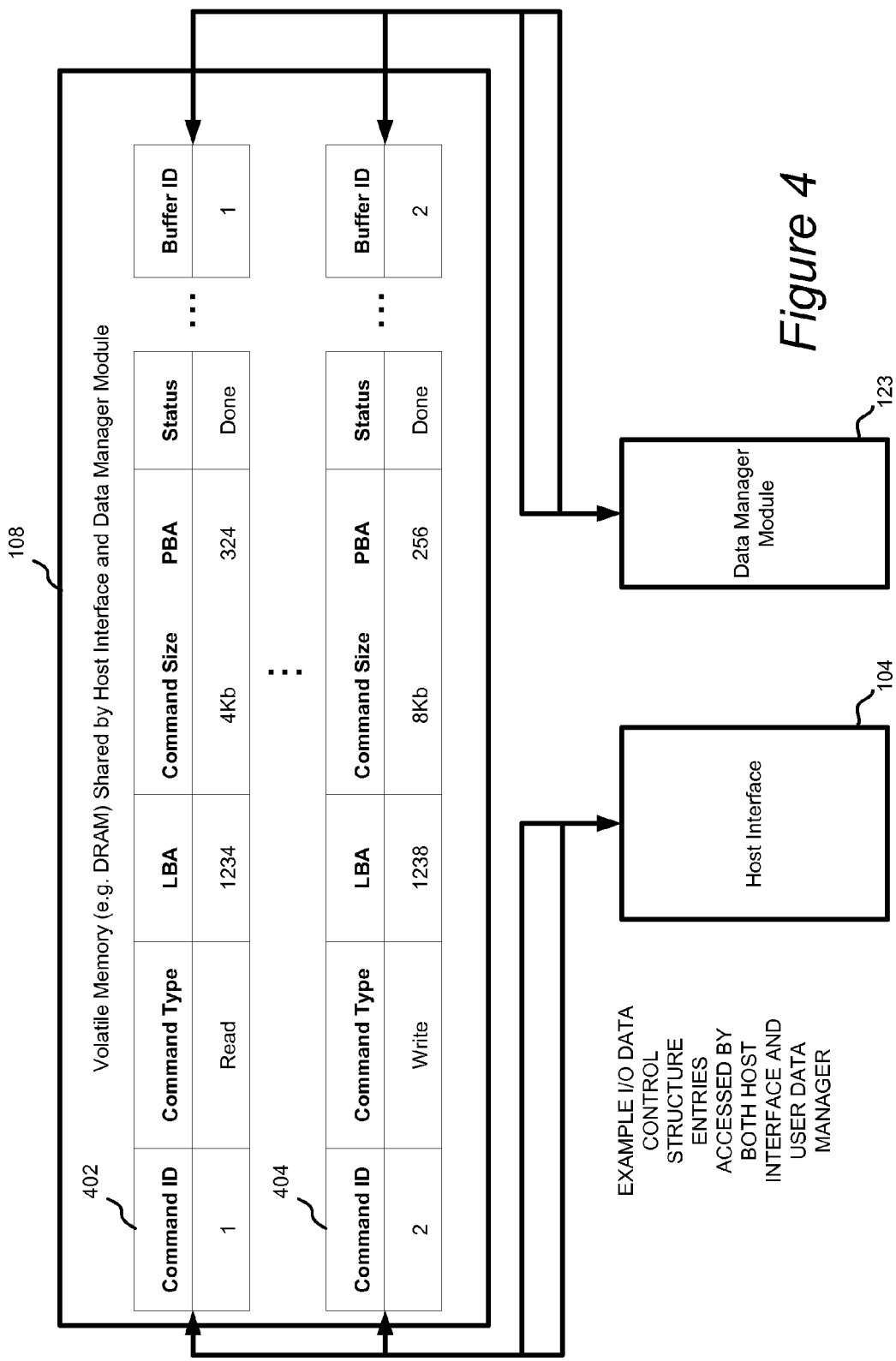
FIG. 4 illustrates example data control structures according to an embodiment.

FIG. 4 illustrates example data control structures according to an embodiment. The figure shows two example data control structures 402 and 404. However, as discussed above, the system may have a sufficient number of data control structures to match a number of concurrent commands that can be processed by the system at one time. In each example data control structure shown, there are fields such as command ID, command type, logical block address (LBA), command size, physical block address (PBA), status, and a buffer ID. As also discussed previously, each data control structure has an associated buffer allocation, and the buffer ID may be used to indicate, or point to, the associated buffer allocation. As shown in FIG. 4, the host interface and the data manger module can each access and update the individual data control structures so that the commands associated with the structures can be tracked. In one embodiment, the system supports pre-arming of these data control structures, i.e., some of the fields are pre-filled prior to command arrival from the host. For example, the command size field may be pre-set to 128 kb for some or all of the data control structures, so that when a new command of that size or smaller arrives from the host, the host interface can use any available data control structure with those pre-set fields and its associated buffer allocation (which has already been pre-allocated). In this manner, the host interface can parse the command and fill in the remaining fields (e.g., LBA) and the command can be dispatched to the back end for the data manager for additional processing.

In one embodiment, for sequential large transfer, the system bundles the updates within the command. For example, if the system is writing two chunks of data within the command, the system updates the mapping information for those two chunks at once. This is done to reduce overhead of command processing time.

CONCLUSION

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, the various components illustrated in FIG. 1 may be implemented as software and/or firmware on a processor or ASIC or as dedicated hardware. For example, those skilled in the art will appreciate that in various embodiments, the actual steps taken in the processes shown in FIG. 2 may differ from those shown in the figures. Depending on the embodiment, certain of the steps described in the example above may be removed, others may be added, and the sequence of steps may be altered and/or performed in parallel. Although this disclosure describes examples in which data are stored in groups of blocks termed superblocks, those skilled in the art will recognize that the various embodiments disclosed are applicable to systems with other memory measurement units such as planes, blocks, pages, sectors, etc. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A non-volatile memory storage system, comprising:
non-volatile storage comprising a plurality of solid-state storage devices; and
control circuitry configured to implement:
an interface to a host system, the interface configured to receive a plurality of commands from the host system; and
a data manager module configured to issue one or more data access requests to the non-volatile storage in response to instructions received from the interface based on the commands from the host system;
wherein the instructions are communicated via one of two data paths in the non-volatile memory storage system, the two data paths including:
a standard performance data path; and
a high performance data path comprising:
volatile memory for storing data control structures containing (1) the instructions from the interface to the data manager module and (2) responses to those instructions from the data manager module; and
a memory buffer for storing data that are to be transferred between the host system and the non-volatile storage, the data being associated with the commands received from the host system;
wherein the data manager module is configured to concurrently process a plurality of instructions from the interface stored in their associated data control structures; and
wherein each of the data control structures includes information related to processing of a command from the host system, wherein both the interface and the data manager module are configured to update the information independently, so that the processing of the command can be performed without delay due to copying of command related data from the interface to the data manager module.

2. The non-volatile memory storage system of claim 1, wherein at least one of the data control structures is pre-configured with command processing information including information related to a data transfer size, so that a command requesting a data transfer size that is smaller than the pre-configured data transfer size can be serviced by the at least one pre-configured data control structure without additional processing to derive the pre-configured command processing information.

3. The non-volatile memory storage system of claim 1, wherein each data control structure is associated with a preset buffer allocation from the memory buffer, the buffer allocation being used for receiving the data to be transferred for the command associated with the respective data control structure.

4. The non-volatile memory storage system of claim 1, wherein the interface is configured to:
in response to receiving a data access command from the host system, communicate an instruction to the data manager module in one of the data control structures.

5. The non-volatile memory storage system of claim 4, wherein the data access command is a write command and wherein the instruction is communicated to the data manager module ahead of the completion of transfer of data from the host system into the memory buffer, so that the processing of the command can take place concurrently with the transfer of data from the host system into the memory buffer.

6. The non-volatile memory storage system of claim 4, wherein the data manager module is configured to:
upon detecting the instruction from the interface in one of the data control structures, process the instruction by performing one or more logical to physical mapping operations; and
when the instruction is for a write command, upon detection of completion of the transfer of the associated data in the memory buffer, issue a plurality of data access requests to the non-volatile storage so that the requests can be executed in parallel in the plurality of solid-state storage devices; and
when the instruction is for a read command, issue a plurality of data access requests to the non-volatile storage so that the requests can be executed in parallel in the plurality of solid-state storage devices.

7. The non-volatile memory storage system of claim 6, wherein the data manager module is configured to:
coalesce status updates from the plurality of solid-state storage devices; and
update the data control structure associated with the instruction with information related to the coalesced status updates.

8. The non-volatile memory storage system of claim 7, wherein the status updates include one or more of: an error notification and a completion notification.

9. The non-volatile memory storage system of claim 1, wherein the plurality of solid-state storage devices comprise dies.

10. The non-volatile memory storage system of claim 1, wherein the number of data control structures match a maximum number of commands from the host system that can be processed in the storage system at a given time, such that each command is associated with a data control structure.

11. The non-volatile memory storage system of claim 10, wherein the maximum number of commands from the host system matches a queue depth in the non-volatile memory storage system that is used to receive commands from the host system in accordance with a specification.

12. The non-volatile memory storage system of claim 1, wherein the control circuitry comprise one or more processors.

13. A method of processing commands in a solid-state storage system comprising non-volatile storage that comprises a plurality of solid-state storage devices, the method comprising:
receiving, by an interface, a plurality of commands from a host system; and
issuing, by a data manager module, one or more data access requests to the non-volatile storage in response to instructions that are sent by the interface based on the commands from the host system;
wherein the instructions are communicated via a high performance data path in the solid-state storage system, the high performing data path comprising:
volatile memory for storing data control structures containing (1) the instructions from the interface to the data manager module and (2) responses to those instructions from the data manager module; and
a memory buffer for storing data that are to be transferred between the host system and the non-volatile storage, the data being associated with the commands received from the host system; and
wherein each of data control structures includes information related to processing of one of the commands from the host system and is configured to be updated by both the interface and the data manager module.

14. The method of claim 13, wherein at least one of the data control structures is pre-configured with command processing information including information related to a data transfer size, so that a command requesting a data transfer size that is smaller than the pre-configured data transfer size can be serviced by the at least one pre-configured data control structure without additional processing to derive the pre-configured command processing information.

15. The method of claim 13, wherein each data control structure is associated with a pre-set buffer allocation from the memory buffer, the buffer allocation being used for receiving the data to be transferred for the command associated with the respective data control structure.

16. The method of claim 13, further comprising:
in response to receiving a data access command from the host system, communicating, by the interface, an instruction to the data manager module in one of the data control structures.

17. The method of claim 16, wherein the data access command is a write command and wherein the instruction is communicated to the data manager module ahead of the completion of transfer of data from the host system into the memory buffer.

18. The method of claim 16, further comprising:
upon detecting the instruction from the interface in one of the data control structures, processing, by the data manager module, the instruction by performing one or more logical to physical mapping operations; and
when the instruction is for a write command, upon detection of completion of the transfer of the associated data in the memory buffer, issuing, by the data manager module, a plurality of data access requests to the non-volatile storage so that the requests can be executed in parallel in the plurality of solid-state storage devices; and
when the instruction is for a read command, issuing, by the data manager module, a plurality of data access requests to the non-volatile storage so that the requests can be executed in parallel in the plurality of solid-state storage devices.

19. The method of claim 18, further comprising:
coalescing, by the data manager module, status updates from the plurality of solid-state storage devices; and
updating, by the data manager module, the data control structure associated with the instruction with information related to the coalesced status updates.

20. The method of claim 19, wherein the status updates include one or more of: an error notification and a completion notification.

21. The method of claim 13, further comprising: concurrently processing, by the data manager module, a plurality of instructions from the interface stored in their associated data control structures.

22. A non-volatile memory storage system, comprising:
non-volatile storage comprising a plurality of solid-state storage devices;
control circuitry configured to implement:
an interface to a host system, the interface configured to receive a plurality of commands from the host system; and
a data manager module configured to:
issue one or more data access requests to the non-volatile storage in response to instructions sent by the interface based on the commands from the host system; and
volatile memory configured to store data control structures through which said instructions are communicated, the data control structures comprising information related to processing of said commands from the host system, wherein both the interface and the data manager module are configured to update said information independently.

23. The non-volatile memory storage system of claim 22, wherein at least one of the data control structures is pre-configured with command processing information including information related to a pre-set data transfer size, so that a command requesting a data transfer size that is smaller than the pre-set data transfer size can be serviced by the at least one pre-configured data control structure without additional processing to derive the pre-configured command processing information.

* * * * *